United States Patent

Hoover et al.

[11] 4,060,488
[45] Nov. 29, 1977

[54] PARTICULATE MEMBRANE ULTRAFILTRATION DEVICE

[75] Inventors: Fred Wayne Hoover; Ralph K. Iler, both of Wilmington, Del.

[73] Assignee: E. I. Du Pont de Nemours and Company, Wilmington, Del.

[21] Appl. No.: 633,835

[22] Filed: Nov. 20, 1975

[51] Int. Cl.² ............................................. B01D 31/00
[52] U.S. Cl. .......................... 210/433 M; 210/500 M
[58] Field of Search ................. 210/23 H, 500 M, 504

[56] References Cited

U.S. PATENT DOCUMENTS

| | | | |
|---|---|---|---|
| 2,635,991 | 4/1953 | Briggs | 210/500 X |
| 3,022,187 | 2/1962 | Eyraud et al. | 210/500 M X |
| 3,158,532 | 11/1964 | Pall et al. | 210/504 X |
| 3,462,362 | 8/1969 | Kollsman | 210/23 H |
| 3,926,799 | 12/1975 | Thomas et al. | 210/23 H |

Primary Examiner—Frank A. Spear, Jr.

[57] ABSTRACT

An ultrafiltration device which includes a porous support, one surface of which is coated with a membrane comprising at least two sizes of particles, one size being capable of passing through the pores and another size capable of passing into but not through the pores.

8 Claims, 4 Drawing Figures

U.S. Patent Nov. 29, 1977 4,060,488
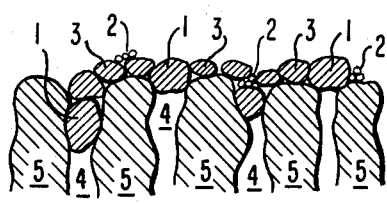
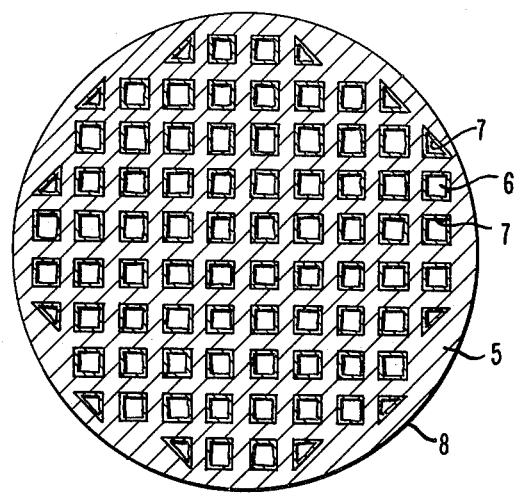
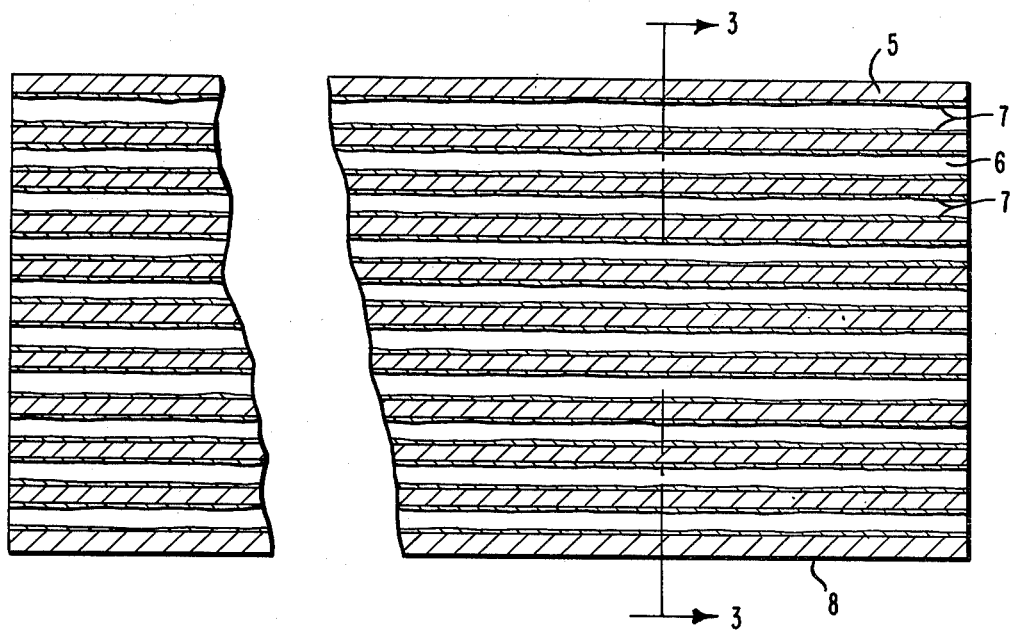

PARTICULATE MEMBRANE ULTRAFILTRATION DEVICE

BACKGROUND OF THE INVENTION

Ultrafiltration devices have been used in the past for the separation of components of a fluid on the basis of the size, shape or physical character of the components through the use of hydraulic pressure. Using these techniques, one component of the fluid is selectively forced through a membrane to separate that component from the remainder of the mixture.

The selective membranes used in ultrafiltration techniques have conventionally been supported on a porous substrate. The fluid components passing through the selective membrane can then also continue to pass through the porous substrate for collection.

While a wide variety of membranes have been used for ultrafiltration separations, previously known membranes have frequently been found to have a limited service time before their rejection properties or filtrate fluxes became unsatisfactory. When the performance of the membrane became unsatisfactory, replacement of the porous support was often required because the membrane was not regenerable or replaceable in place to restore performance. Further, many known ultrafiltration membranes have little utility when used at elevated temperatures or with solvent or corrosive media such as fluids containing acetone or hydrochloric acid.

SUMMARY OF THE INVENTION

The instant invention provides an improved ultrafiltration device having a membrane which not only provides excellent performance as an ultrafiltration membrane, but can be regenerated or replaced while the device is installed, and resists deterioration by corrosive feed stocks.

Specifically, the instant invention provides, in an ultrafiltration device of the type comprising an integral porous support having pores about from 0.5 to 45 microns in their smallest cross sectional dimension and a particulate membrane coated onto at least a portion of the surface of the support, the improvement wherein the membrane comprises a. large inorganic particles about from 0.5 to 45 microns in average cross sectional dimension and of such size as will enter but not pass through the pores of the support and b. small inorganic particles about from 0.002 to 0.5 microns in average cross sectional dimension and of such size as will pass through the pores of the support.

BRIEF DESCRIPTION OF THE DRAWINGS

FIG. 1 is a cross sectional view of a membrane and porous support in an ultrafiltration device of the present invention.

FIG. 2 is a longitudinal cross sectional view of an ultrafiltration device of this invention.

FIG. 3 is a cross sectional view of an ultrafiltration device taken through line 3—3 of FIG. 2.

DETAILED DESCRIPTION OF THE INVENTION

Figure 4:
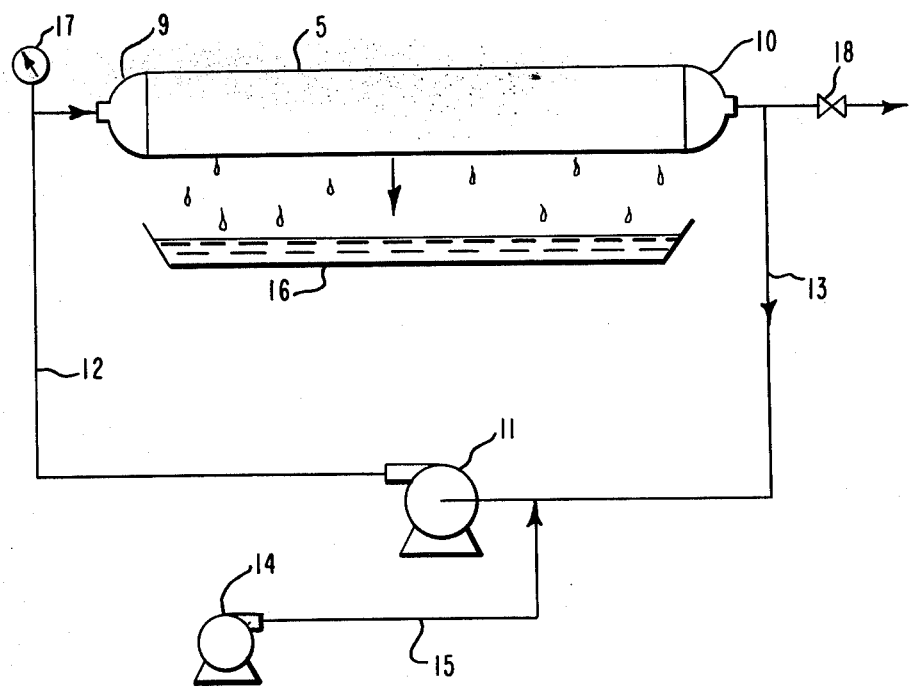
FIG. 4 is a schematic diagram of an ultrafiltration apparatus embodying a device of the present invention.

The particulate membranes used in this invention comprise relatively large particles which can pass into but not through the support pores and relatively small particles which readily pass through the support pores. The large particles have sizes close to support pore sizes, no larger than 45 microns, to permit them to sink into or bridge the pores. Enough large particles should be present to provide at least about 10 gm. per m.$^2$ of the support first surface. These particles can be about from 0.5 to 45 microns in their average cross-sectional dimension and are normally about from 2 to 20 microns. Particularly satisfactory performance has been realized with large particles of about from 3 to 10 microns.

The small particles are present in such size and quantity as to fill the gaps left by the large particles against the support and other large particles. These small particles can be about from 0.002 to 0.5 microns in size, and are normally about from 0.004 to 0.4 micron. The small particles are generally present in quantities of at least about 0.5 gm./m.$^2$. A narrow size range for the small particles causes the openings in the membrane to be more consistent in size, resulting in good filtrate flux and uniform selectivity in rejection of feed stock components.

The membrane can also comprise particles intermediate in size to the ranges of the large and small particles. These particles can be about from 0.1 to 5.0 microns. In preferred cases, the size range of the intermediate particles is 0.2 to 2 microns, of the large particles 3 to 10 microns and of the small particles 0.004 to 0.4 micron. The intermediate particles generally have sizes falling outside the ranges of the large and small particles, and are typically present in quantities of at least about 1.0 gm. per m.$^2$.

The particle sizes indicated are their average cross-sectional dimensions. They can be measured by diluting a particle suspension, spotting a slide with the dilute suspension and comparing a magnified view of the particles with a suitable comparison grid. Normally a microscope adequately magnifies micron sizes while millimicron sizes often require an electron microscope.

The membrane particles can be any inorganic material which is inert to intended feed stock and stable at the ultrafiltration temperature. Such materials include inert oxides such as alumina, silica, zirconia, thoria, titania, stannic oxide, mixtures and chemical combinations thereof such as zirconium silicate, asbestos, needle-like potassium titanate, and carbon particles of suitable dimensions. Preferred materials are alumina, silica, zirconia and chemical combinations thereof. Membranes of such compositions resist the deteriorating effects of acids and organic solvents such as acetic acid, dimethylformamide, dimethylsulfoxide, chlorinated hydrocarbons or the like.

The composition and configuration of the integral porous support can vary widely. The membrane support can be any material which resists the operating pressure, is inert to the feed stock, is stable at the use temperature and has the defined porosity. The material is usually inorganic for use at temperatures as high as 300° C., and preferably it is a ceramic material. Included among such materials are silica ($SiO_2$), zirconia ($ZrO_2$), titania ($TiO_2$), alumina ($Al_2O_3$), spinel ($MgO.Al_2O_3$), mullite ($3Al_2O_3.2SiO_2$), rare earth oxides alone and in chemical combinations, including aluminosilicates and cordierite ($2MgO.2Al_2O_3.5SiO_2$), and carbon.

The configuration of the membrane support, in its most basic form, can be a flat plate, one surface of which is provided with a membrane as required in the instant invention. In operation, the fluid to be purified would be supplied to the membrane coating, and means provided for the collection of filtrate on the uncoated surface. More typically in the ultrafiltration art, a block of the porous support is provided with channels through the block, and these channels are coated with the ultrafiltration membrane. The fluid is then passed through the channels, and filtrate passes through the membrane, then through the porous material for collection at the periphery of the structure.

The pore sizes of the support and their distribution can be determined by the following method. The material, having a known volume, is submerged in liquid mercury under substantially zero absolute pressure. A series of increased absolute pressures is applied to the mercury and the cumulative mercury volume penetration of the material is measured at each pressure. Pressure increases are stopped when they no longer significantly increase the cumulative mercury penetration. The smallest pore size penetrated at each pressure is calculated as a function of that pressure as long as that pressure increased the mercury penetration over that of the preceding lower pressure. The radius of the smallest pore penetrated is related to the pressure by the expression $$r = -(2\gamma/\Delta P) \cos(180° - \phi)$$

where $r$ is the radius in cm. of the pore penetrated, $\gamma$ is the surface tension in dynes/cm. of the liquid mercury (480 dynes/cm. at 20° C.), $\Delta P$ is the pressure excess in dynes/cm.$^2$ and $\phi$ is 140°, the average angle of contact between mercury and a solid. The distribution of the pore sizes is calculated as a function of the relation of the progressive penetration volume differences to the total mercury volume penetration. Of course, surface pores extend into the porous material with constrictions beneath the surface but the volume effect by these constrictions on mercury porosimeter determinations is negligible in supports for this invention.

A mercury porosimeter adapted for use in the above method is the 15,000 PSI, Motor Driven, Aminco Digital Readout Porosimeter, sold by American Instrument Co., Inc., Silver Springs, Maryland.

A particularly satisfactory support configuration is a block of cordierite having a right cylindrical configuration in which channels are formed for coating. Most preferably, the surface area of the passageways or channels formed in the support is equal to about from 300 to 2000 square meters per cubic meter of support and the Permeability Factor is greater than about $1.0 \times 10^{-4}$m. The Permeability Factor is the product of (a) the decimal proportion of the volume of the pores of the element material to the total volume occupied by the material and (b) the decimal proportion of the volume of support material exclusive of the passageways to the total volume of the support, including the passageways, divided by (c) the surface area of the passageways formed in the porous support in square meters per cubic meter of total volume of support.

The membranes can be formed on the surface of the support element using dispersions of the particles in a suspending liquid. Most conveniently, the suspending liquid is passed through the porous structure so as to deposit the membrane-forming particles in the pores of the structure and on the surface. The liquid used should be one which readily passes through the smallest openings in the finally formed membrane. The large and small particles, together or in sequence, are introduced into the suspending liquid. Larger particles in the suspending liquid are locked by the pores of the support element, and accumulate on the surface of the support. Smaller particles pass through the pores of the support element to the free surface in progressingly decreasing amounts after the larger particles are deposited on the initially contacted surface. A membrane formation is complete when the smallest particles become entrapped as part of the membrane. Similarly, when intermediate particles are used in the formation of a membrane, they are introduced into the suspending liquid before the small particles stop circulating with the suspending fluid through the porous support.

Membranes so formed remain in place as long as they are damp and rigid supports containing them are not jarred when handled. The membranes can be converted into coherent dry structures resistant to the effects of support handling by binding the particles together. To do this, the membranes can be heated to liquid-evaporating temperatures, for example, about from 100° to 300° C., depending on the heat resistance of the support material. The wet membrane can be treated with alkaline solutions of silica and heated to 90°–100° C. while in contact with those solutions to assure binding the particles together securely. Such treatment often improves the membrane discrimination of solutes to be rejected. The circulation of dilute sodium silicate solutions conveniently results in the deposition of small silica particles in the membrane and binds the membrane on heating.

The present invention will be more fully understood by reference to the drawings.

In FIG. 1, a detailed cross section of a membrane of the present invention on a porous support is illustrated. The membrane consists of large particles 1, small particles 2 and intermediate size particles 3. The large particles are of a size adapted to bridge or to penetrate pore openings 4 to a depth of up to about 2 large particle diameters. The small particles 2 are lodged in gaps between the large particles 1 and the surface of support element 5 as well as between adjacent large particles. The small particles are separated from adjacent small particles, large particles and the surface of the membrane by small openings. Intermediate particles 3 lodge in or bridge large gaps between large particles and the surface of the membrane or between adjacent large particles. Small particles 2 lodge in gaps around the intermediate particles, providing the smallest openings in the membrane. Sufficient small particles are present to make these smallest openings the only openings in the complete membranes, having little size variation.

For ultrafiltration, these smallest openings have effective diameters of at least about 0.002 millimicron (2 nanometer), no larger than about one millimicron. Normally, they are in the range of about from 3 to 8 nanometers. With these opening sizes, the membranes can be expected to allow dissolved solutes of molecular weights in the range 200–800 to pass through the membranes at 0.31–15.5 kg./cm.$^2$ gauge whereas dissolved solutes with higher molecular weights will be rejected from passing through.

In FIGS. 2 and 3, integral support element 5 has multiple square passageways 6 in general alignment with each other extending along its longitudinal axis. Membrane 7 coats the surface of each passageway 6. In operation, filtrate going through passageway 6 penetrates membrane 7, and is conducted through the porous support element to exterior surface 8 of the element, where the filtrate is discharged.

A typical ultrafiltration apparatus incorporating the present ultrafiltration device is as illustrated by FIG. 4. Support element 5 is secured against feed inlet 9 and feed outlet 10 so that no feed stock leaks between the inlet or outlet and the periphery of the element. The exterior of element 5 is exposed to atmospheric pressure. Recirculating pump 11 causes feed stock to flow through line 12 to inlet 9 and recirculates feed stock from outlet 10 through line 13. Pump 14 supplies new feed stock through line 15 as makeup for filtrate lost through the exterior of element 5. Filtrate is collected in catch vessel 16. Pressure indicated by gauge 17 is controlled according to the discharge of concentrated feed stock through valve 18, the flow of fresh feed stock through pump 14 and the flux of filtrate from the support elements.

The ultrafiltration devices of the instant invention can be used for treating a wide variety of process liquids to concentrate or purify components of the liquids. Fluid streams which can be purified using the present devices can typically be found in chemical manufacturing and processing, pharmaceutical preparation, food and beverage processing, sewage treatment, and other applications involving a fluid stream containing components separable by ultrafiltration membranes. Moreover, the present devices permit the use of materials in the construction which are resistant to a wide range of corrosive conditions; thus further broadening their potential industrial applications.

Using the present inorganic membranes on the defined supports enables maintaining good ultrafiltration fluxes with good selective rejection from feed stock in cross flow for a useful time. Effective fluxes are easily restored by in-place membrane regeneration and by in-place membrane removal and renewal. For membrane replacement, a solution sufficiently acidic or alkaline to dissolve all or part of the particles of the membrane is passed along the membrane under circulation pressure, followed by rinsing. Particles in a suitable dispersing liquid are then reapplied to replace those removed. Back flushing through the porous support with filtrate or its equivalent can completely remove membranes without binders.

The ultrafiltration devices of the present invention are effective at temperatures well above ambient. They can be used with aqueous feed stock up to boiling temperatures and will filter liquids at 300° C. when the support also tolerates such temperatures. In many applications, the high temperature operability of the present membranes affords improved fluxes over ambient temperature operation.

The invention is further illustrated by the following specific examples.

EXAMPLE 1

A ceramic 120-channel support, which had a filtration area of 0.88 m.$^2$ and pores in the range of 2 to 20 $\mu$, was connected to a pump so that feed could be circulated through the channels under pressure. The filtrate egressed through the exterior porous walls of the ceramic support and was collected.

A 0.5% dispersion of 13 to 14 m$\mu$ silica particles and 4 to 5 m$\mu$ silica particles was circulated through the channels under a pressure of 2.8–5.6 kg./cm.$^2$. The silica particles were not rejected by the support. A membrane coating was applied to the support by adding 12 grams of 3–6 micron (average 4.5) diameter large size alumina particles to the circulating feed portionwise over a period of 25 minutes. Near the end of this period, 2 g. of 0.1–1.4 micron intermediate size zirconium silicate particles were also added. The small silica particles already circulating further added to the membrane, which then rejected silica particles and oil.

The system was flushed with water and used to purify an oil-containing alkaline metal cleaning solution obtained from an automobile assembly plant. This had been used to clean automotive parts oily with forming lubricants. The oil was readily rejected by the membrane coating and the ultrafiltrate was clean reusable matal cleaning solution.

Ultrafiltration of the oil-containing cleaning solution was continued over a period of 3 days. The initial flux was 570 l./m.$^2$/day at 1.2 kg./cm.$^2$ (60° C.). At the end of the three-day period, the flux had dropped to 200 l./m.$^2$/day at 20 kg./cm.$^2$ (60° C.). To restore flux, the foulants and components of the membrane were removed by circulating hot filtrate at 60° C. and then flushing with water. The filter was then fed with a 0.5% dispersion of 3–6 nm. and 13–14 nm. silica to redeposit particles on the membrane until that silica was rejected.

The restored membrane was again fed with the oil-containing cleaning solution. The flux was 815 l./m.$^2$/day at 1.34 kg./cm.$^2$ (60° C.). After another 4-day run, the flux had declined to 408 l./m.$^2$/day. At this time, the above treatment was repeated and the membrane again restored to give good flux and rejection.

The cleaning and restoration of flux was repeated several more times with excellent results.

EXAMPLE 2

A coated ultrafiltration device was prepared as in Example 1. Twelve liters of rinse acetone containing pigments, resins and other impurities was introduced into this device. It was recycled at 0.9 m./sec. at 1.0 kg./cm.$^2$. Initially the filtrate rate was 2,800 l./m.$^2$/day and after 12 hours 700 l./m.$^2$/day. The impurities in the circulating acetone increased in concentration to 9.2% while decreasing in the filtrate. Ash analysis showed no inorganic materials in the acetone filtrate and about 1.3% organics at the start and 2.3% at the end of the run. The purified acetone was thus clean enough to be reused.

EXAMPLE 3

An ultrafiltration device was prepared according to the general procedures of Example 1.

The filtrate from a pressure filter containing a phthalocyanine pigment dispersed in a pH 2.8 aqueous medium was circulated through the device at 2.2 m./sec. The initial flux was 2,100 l./m.$^2$ filter surface/day and decreased to 450 l./m.$^2$/day after 20 hours during which time the feed was concentrated from 0.7% to 2.28% with complete rejection of the pigment.

EXAMPLE 4

A length of multichanneled ceramic support with 0.13 m.$^2$ filtering surface and having 2-20 micron pores was coated at 1.6 m./sec. with 2 gm. 5–9 $\mu$ (6.5 average) large alumina particles in a solution of Na$_2$O.3.25 SiO$_2$ containing 2% SiO$_2$, followed by the addition of 5 gm. 3–6 $\mu$ alumina and 2 gm. intermediate colloidal asbestos particles (0.2 micron dia. × average 2 micron length). The support was then flushed with hot distilled water. A 0.5% dispersion of 13–14 m$\mu$ small silica particles was flowed through the channels at 1.6 m./sec., 2.9–3.5 kg./cm.$^2$ and 44°–50° C., resulting in some incorporation of the silica into the membrane and a high silica rejection at a filtrate flux of 4,200–5,785 l./m.$^2$/day.

An aqueous dispersion of polytetrafluoroethylene particles, averaging about 0.5 microns and resulting from the polymeriztion of tetrafluoroethylene, was flowed through the coated support at 3 m./sec., 2.8 kg./cm.$^2$ and 40° C. The filtrate was clear and its flux was 277 l./m.$^2$/day.

EXAMPLE 5

A support element was enclosed in a 5.4 cm. diameter stainless steel tube having a wall thickness of 0.09 cm. This element was a cylindrically-shaped 4.75 cm. diameter by 121.9 cm. length of porous cordierite. It had 140 0.20 cm. by 0.20 cm. square channels along its length between 0.09 cm. thick webs. The filtering surface of the element was 820 m.$^2$ per cubic meter or 1.39 m.$^2$ in the 121.9 cm. length. The porous cordierite had 51% void space and its pore openings were in the 2–20 $\mu$ range, of which 80–85% were in the 5–10 $\mu$ range.

Of the 140 channels in the support element, 112 were used for filtration. A permselective inorganic membrane was formed on the surfaces of this support in contact with feed by circulating a sodium silicate solution containing 2% SiO$_2$ as Na$_2$O.3.25 SiO$_2$ through the device under a pressure drop of 0.56 kg./cm.$^2$ at an average pressure of 1.8 kg./cm.$^2$ on the filter surface. Large alumina grit particles (10 g.) having a mean size of 6.5 $\mu$ and a size range of 5 to 9 $\mu$, were added and filtered onto the surface of the support. The permeate exit valve was shut off intermittently to insure good distribution of grit on all the channel walls. This was continued for 20 min. at which time virtually all of the grit was entrapped in the surface pores. During the next 30 min. three 10 g. portions of intermediate sized alumina particles (1,200 grit, mean size 4.5 $\mu$, range 3–6 $\mu$) were likewise filtered onto the surface of the support. Small zirconium silicate particles (0.1–1.4 $\mu$) were circulated for 40 minutes under the same conditions. The temperature was raised to 90° C. with circulation of the sodium silicate solution at 5.6 kg./cm.$^2$ into the device and 1.4 kg./cm.$^2$ out. This treatment served to provide small silica particles and to bind the membrane together. The system was then rinsed with deionized water.

A 0.5% dispersion of 0.015 $\mu$ silica particles was circulated through the filter at 1.7–2.4 kg./cm.$^2$, 35° C. and 1.6 m./sec. The rejection of this silica was excellent and the permeate flux was 1.2 × 10$^4$ l./m.$^2$/day. A 0.5% dispersion of smaller silica particles (0.004–0.005 $\mu$) was added to the feed. The rejection of these very small silica particles was also excellent. The device was flushed with deionized water and a 2% NaAlO$_2$ solution then was circulated through the device at 33° C. for 40 min. The treatment of sodium aluminate further improved the durability and permselectivity of the membrane. The device was flushed with deionized water and its performance checked on a dispersed silica mixture containing about 0.5% 15 nm. and 0.5% 4–5 nm. silica particles. The rejection of this silica was excellent and the flux was 5,622 l./m.$^2$/day at 1.7 kg./cm.$^2$ (28.5° C.).

This ultrafilter was used to separate and concentrate polytetrafluoroethylene dispersed in an aqueous waste stream at the rates of 1,630 l./m.$^2$/day/1.7 kg./cm.$^2$/50° C. Several batches of waste dispersion were concentrated over a period of 5 days.

The device stood unused for about 1 month after which time it was treated with 2% NH$_4$OH (pH 11.5) for 30 min. at 29° C. and dilute NaOH (pH 12.5) for 35 min. at 55° C. The old coating was removed along with foulants as indicated by a high water flux and lack of rejection of 4–5 nm. and 15 nm. silica particles.

The ultrafiltration membrane was regenerated in situ by treating the filter with a circulating sodium silicate solution containing 2% SiO$_2$ as Na$_2$O.3.25 SiO$_2$ and 5 g. of zirconium silicate (0.1–1.4 $\mu$) for 20 minutes. This membrane gave excellent rejection of the smallest commercially available colloidal silica particles, measuring 0.004–0.005 $\mu$.

On two more occasions, this filter was restored to its original efficiency by treatment with base and then hot sodium silicate solution containing more of the original Al$_2$O$_3$ or zirconium silicate particles.

EXAMPLE 6

An aqueous dispersion of 1–10 micron (average 7 micron) zirconium silicate large particles was circulated at 2.8 kg./cm.$^2$ through an alumina tube of one inch inside diameter and having surface pores in the 2–44 micron range until the filtrate flux levelled out from 40,000 l./m.$^2$/day to 13,500 l./m.$^2$/day (one hour required). A 10% dispersion of 13–14 millimicron silica small particles was introduced into circulation, serving as both membrane forming material and feed stock to be concentrated.

Filtrate flux, initially 360 l./m.$^2$/day, fell off to 305 l./m.$^2$/day after 50 minutes. At that time, the silica in the feed stock had concentrated to 20.9% and the filtrate contained 1.9% silica.

We claim:

1. In an ultrafiltration device of the type comprising an integral porous support having pores about from 0.5 to 45 microns in their smallest cross sectional dimension and a removable and renewable particulate membrane inert to feedstock coated onto at least a portion of the surface of the support, the improvement wherein the membrane comprises
   a. large inorganic particles about from 0.5 to 45 microns in average cross sectional dimension and of such size as will enter but not pass through the pores of the support and
   b. small inorganic particles about from 0.002 to 0.5 microns in average cross sectional dimension and of such size as will pass through the pores of the support, said particles being bonded together with silica particles formed by heating the membrane with an alkaline solution of silica at about 90°–100° C.

2. An ultrafiltration device of claim 1 wherein the support has 2–20 micron pores, the size range of the large particles is about from 2 to 20 microns and the size range of the small particles is about from 0.004 to 0.4 microns.

3. An ultrafiltration device of claim 1 wherein the membrane further comprises inorganic particles intermediate in size between the large and the small particles, the size range of the intermediate-sized particles being substantially nonoverlapping with the size ranges of the large and small particles.

4. An ultrafiltration device of claim 3 wherein the intermediate size particles are about from 0.1 to 5.0 microns in average cross sectional dimensions.

5. An ultrafiltration device of claim 4 wherein the size range of the large particles is 3 to 10 microns, of the small particles is 0.004 to 0.4 microns and of the intermediate particles is 0.2 to 2 microns.

6. An ultrafiltration device of claim 1 in which the inorganic particles comprise at least one of alumina, silica, zirconia, thoria, titania, stannic oxide, and carbon.

7. An ultrafiltration device of claim 6 in which the small inorganic particles consist essentially of alumina or silica.

8. An ultrafiltration device of claim 1 in which the silica-treated membrane is further treated with sodium aluminate.

* * * * *